May 11, 1926.

D. McKAY 1,584,625

AUTOMATIC SAFETY BLOW-OFF COCK AND VALVE

Filed July 15, 1925

Inventor
Donald McKay
By C. A. Snow & Co.
Attorneys

Patented May 11, 1926.

1,584,625

UNITED STATES PATENT OFFICE.

DONALD McKAY, OF MONTGOMERY, ALABAMA.

AUTOMATIC SAFETY BLOW-OFF COCK AND VALVE.

Application filed July 15, 1925. Serial No. 43,874.

This invention relates to automatic safety blow off cocks and valves for steam boilers.

The object of the invention is to provide a device of this character so constructed as to automatically cut off the steam in case the blow off valve should be broken or rendered inoperative in any way thereby preventing scalding of persons in the vicinity as well as the wasting of steam.

Another object of the invention is to provide a simple and cheap device of this character which may be readily applied to an ordinary blow off cock or to any other valve through which steam passes.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
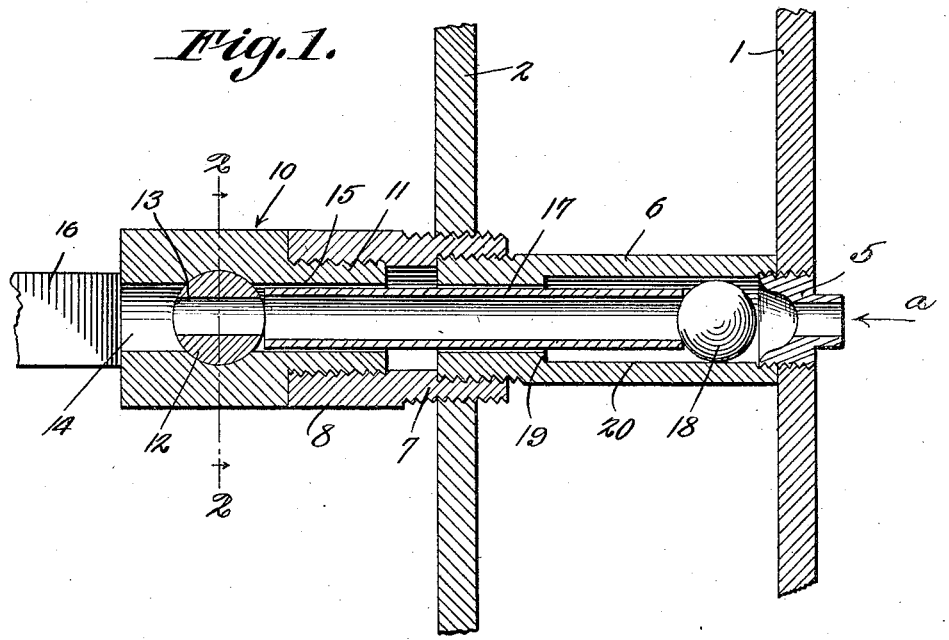
Figure 2:
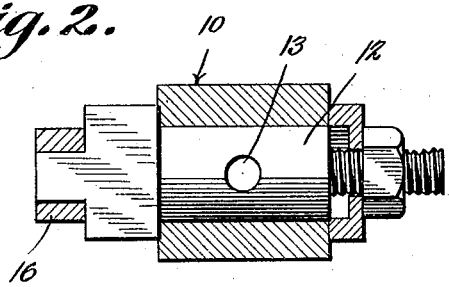

Figure 1 represents a longitudinal section of a blow off cock with this improved safety valve attached shown in operative position; and Figure 2 is a transverse section taken on the line 2—2 of Figure 1.

This automatic safety valve may be used at any desired place on a boiler or it may be connected with any container having compressed fluid adapted to be drawn off through a cock.

In Figure 1 the inner sheet or wall of a steam boiler is shown at 1 and the outer sheet or wall at 2, the steam chamber being within the sheet 1. Threaded in sheet 1 is a ball-stop in the form of a hollow nipple 5 through which the steam from chamber 3 is designed to pass into a pipe or tube 6 located between shells 1 and 2 and with one of which the nipple 5 has threaded engagement. The other end of the pipe 6 is externally threaded and has threaded engagement with a pipe 7 being inserted in said pipe and said pipe having threaded engagement with the boiler sheet 2. This pipe 7 is designed to be connected with the blow off valve 10 which has a threaded neck 11 engaged with the outer end of pipe 7. Said pipe 7 having an angular head 8 to facilitate its insertion and removal by means of a suitable tool.

The blow off valve 10 is shown provided with the usual rotary valve 12 having a bore 13 extending transversely therethrough and which when the valve is turned to the direction shown in Figure 1 registers with the bores 14 and 15 formed in the valve casing. An operating bar or lever 16 is connected with the valve 12 and is designed to be operated from a suitable point for actuating the valve to turn on or cut off the steam.

A reciprocatory plunger or piston 17 made in the form of a tube is mounted in the pipe 6 and the bore 15 of the valve casing 10. This plunger is made shorter than the combined length of these pipes and is designed to move longitudinally therein. A ball valve 18 is mounted in the pipe 6 between the adjacent end of the plunger 17 and the nipple 5. This valve 18 normally assumes the position shown in Figure 1 bearing against the end of the plunger 17 in which position it is held by the steam passing through the pipe in the direction of the arrow shown at $a$. The pipe 6 is shouldered near the outer end as shown at 19 to provide a seat for the ball.

It is obvious that the pipe 17 is sufficiently small to permit the steam to pass around it and out through the bore 13 of the valve 10 when said valve is open.

The plunger 17 holds the ball valve 18 normally open and prevents its being seated on the seat 19 which would occur if this pipe or plunger 17 were not provided.

In case the connection 7 should be broken off outside the boiler, as frequently happens, the valve 12 would be moved out of the path of pipe 17 and the pressure of steam against the ball 18 would project said pipe and permit the ball to move into pipe 6 and securely seat thereby automatically cutting off any further passage of steam.

It is to be understood that this improved blow off cock and safety valve may be located at any suitable point in the boiler where steam is designed to be drawn off.

I claim:—

1. The combination with the inner and outer walls of a fluid-pressure-container, of a pipe mounted in the outer wall, a ball-stop mounted in the inner wall, a tube mounted at one end within the pipe, one end of the ball-stop being received within the opposite end of the tube, the tube having an internal ball-receiving shoulder, a valve casing connected to the pipe externally of the outer wall, a ball in the tube, between the stop and the shoulder, and a loose plunger disposed between the valve and the ball.

2. The combination set up in claim 1, and further characterized by the fact that the plunger is of tubular form, thereby to permit fluid to pass through the plunger and lessen the force with which the plunger is expelled, when the valve casing is broken off, the tubular form of the plunger enabling it to centralize the ball with respect to the axis of the tube and to permit fluid to pass about the ball, when the device is in normal working condition and when the valve is opened.

In testimony that I claim the foregoing as my own, I have hereto affixed my signature.

DONALD McKAY.